(12) United States Patent
Wendling et al.

(10) Patent No.: US 7,900,253 B2
(45) Date of Patent: *Mar. 1, 2011

(54) SYSTEMS AND METHODS FOR AUTHORIZATION CREDENTIAL EMULATION

(75) Inventors: Jean-Hugues Wendling, Denver, CO (US); John D. Menzel, Highlands Ranch, CO (US)

(73) Assignee: XceedId Corporation, Golden, CO (US)

( * ) Notice: Subject to any disclaimer, the term of this patent is extended or adjusted under 35 U.S.C. 154(b) by 896 days.

This patent is subject to a terminal disclaimer.

(21) Appl. No.: 11/076,541

(22) Filed: Mar. 8, 2005

(65) Prior Publication Data

US 2006/0206924 A1   Sep. 14, 2006

(51) Int. Cl.
*H04K 1/00* (2006.01)
*H04L 9/32* (2006.01)

(52) U.S. Cl. .............................. 726/20; 726/5; 726/19; 713/185

(58) Field of Classification Search ...................... 726/5, 726/7, 9, 19, 20; 713/185; 380/249; 705/16
See application file for complete search history.

(56) References Cited

U.S. PATENT DOCUMENTS

| | | | |
|---|---|---|---|
| 5,041,826 A | 8/1991 | Milheiser | |
| 5,166,676 A | 11/1992 | Milheiser | |
| 5,235,326 A | 8/1993 | Beigel et al. | |
| 5,748,732 A * | 5/1998 | Le Berre et al. | 380/229 |
| 5,805,912 A * | 9/1998 | Johnson et al. | 712/40 |
| 5,822,548 A * | 10/1998 | Story et al. | 710/106 |
| 5,936,544 A | 8/1999 | Gonzales et al. | |
| 6,750,771 B1 | 6/2004 | Brand | |
| 6,888,459 B2 | 5/2005 | Stilp | |
| 6,963,267 B2 | 11/2005 | Murray | |
| 7,019,639 B2 | 3/2006 | Stilp | |
| 7,023,341 B2 | 4/2006 | Stilp | |
| 7,119,738 B2 | 10/2006 | Bridgelall et al. | |
| 7,268,687 B2 | 9/2007 | Egbert et al. | |
| 7,321,300 B2 | 1/2008 | Friedrich et al. | |
| 7,439,862 B2 | 10/2008 | Quan | |

(Continued)

FOREIGN PATENT DOCUMENTS

EP   1379052   7/2004

OTHER PUBLICATIONS

U.S. Appl. No. 11/076,090, filed Mar. 8, 2005, Conlin.

(Continued)

*Primary Examiner* — Benjamin E Lanier
*Assistant Examiner* — Hadi Armouche
(74) *Attorney, Agent, or Firm* — Michael Best & Friedrich LLP (57) ABSTRACT

Systems and methods for emulating credentials. In some cases, the systems include an access control module with an access credential reader that is operable to receive an access information from one access credential, and an access credential writer that is operable to provide at least a portion of the access information to another access credential. The written access credential is operable to receive the portion of the access information from the access credential writer. Upon receiving the information, the written access credential becomes operable to access an access point. Some systems and methods are related to access control, while other systems and methods are related to payment, access, and/or other transaction devices used in relation to credentials.

17 Claims, 6 Drawing Sheets

U.S. PATENT DOCUMENTS

| | | |
|---|---|---|
| 2001/0045454 A1 | 11/2001 | Gangi |
| 2002/0007454 A1* | 1/2002 | Tarpenning et al. ......... 713/156 |
| 2002/0147792 A1 | 10/2002 | Harrison et al. |
| 2003/0046541 A1* | 3/2003 | Gerdes et al. ............... 713/168 |
| 2003/0048174 A1 | 3/2003 | Stevens et al. |
| 2004/0215964 A1 | 10/2004 | Barlow et al. |
| 2006/0224901 A1 | 10/2006 | Lowe |
| 2006/0283958 A1 | 12/2006 | Osterweil |
| 2006/0290502 A1 | 12/2006 | Rawlings |
| 2007/0008140 A1 | 1/2007 | Saarisalo et al. |
| 2007/0057057 A1 | 3/2007 | Andresky |
| 2007/0246546 A1 | 10/2007 | Yoshida |

OTHER PUBLICATIONS

U.S. Appl. No. 11/193,703, filed Jul. 28, 2005, Wendling.
"Skyetek RFID Readers", Data Sheet, Jul. 4, 2003, p. 1.
Hamilton, D.M., Amendment and Response in U.S. Appl. No. 11/193,703, filed Apr. 10, 2009; pp. 1-9.
Simitoski, M.J., Non-Final Office Action in U.S. Appl. No. 11/193,703, Mailed Jan. 16, 2009; pp. 1-11.
Hamilton, D.M., Amendment and Response in U.S. Appl. No. 11/076,090, filed Jan. 28, 2009; pp. 1-8
Revak, C.A., Non-Final Office Action in U.S. Appl. No. 11/076,090, Mailed Oct. 27, 2008; pp. 1-10.

* cited by examiner

Fig. 4

SYSTEMS AND METHODS FOR AUTHORIZATION CREDENTIAL EMULATION

BACKGROUND OF THE INVENTION

The present invention is related to transaction devices, and more particularly to systems and methods for emulating credentials for accessing transaction devices.

It has become common for a consumer to use a credit card to pay for a purchase using a credit card, or for an employee to gain access to a workspace by presenting an access card at an enabled access point. At least in part due to the extensive use of credit and access cards, it is not uncommon for a person to have five or more such cards on their person at any given time. This causes some degree of confusion and complexity to the person carrying and/or using the cards.

Further, the cards are of varied type and complexity. Thus, for example, a person may have a magnetic stripe card, a smart card, and a radio frequency card. Each of these cards serve different purposed and perform in different ways. Thus, while there are standards to which the various cards conform, there is not a single card type making it unlikely that a single ubiquitous card will be selected and supported.

Hence, for at least the aforementioned reasons, there exists a need in the art for advanced systems and methods for performing transactions.

BRIEF SUMMARY OF THE INVENTION

The present invention is related to transaction devices, and more particularly to systems and methods for emulating credentials for accessing transaction devices.

Various embodiments of the present invention provide systems for emulating access credentials. The systems include an access control module with an access credential reader and an access credential writer. The access credential reader is operable to receive an access information from one access credential, and the access credential writer is operable to provide the access information to another access credential. In so doing, the access credential receiving the access information becomes operable to access an access point upon receiving the access information. In particular cases of the embodiments, the access control module is deployed local to the access point. Further, in some cases, the access control module is directly linked to an actuator associated with the access control point.

The access credentials can be, but are not limited to smart cards, magnetic stripe cards, cell phones, radio frequency cards, and personal digital assistants. In some cases, the credential being read by the access module is wirelessly coupled to the access module, while the credential being written by the access module is coupled to the access module via a wired interface. Various other embodiments of the present invention couple the credentials to the access control module using one or more interfaces that can include, but are not limited to, a magnetic stripe interface, a radio frequency interface, an optical interface, and a wired interface. In one particular instance of the embodiments, the access credential being read is a smart card, -and the access credential being written is a cell phone. In this particular case, the smart card is communicably coupled to the access credential reader via a wireless interface, and the cell phone is communicably coupled to the access control module via a wired interface.

In some instances of the embodiments, the access control module is capable of communicating at two or more frequencies. In such a case, the access credential being read is read at one frequency, and the access credential being written is written at a second frequency. The information being read and written can be in the form of bit streams.

Other embodiments of the present invention provide methods for credential emulation. The methods include providing a transaction device. In some cases, the transaction device is deployed at a point of use. The methods further include receiving an information set by the transaction device from one credential, and writing at least a portion of the information set from the transaction device to another credential. The transaction device may be one of a variety of devices typically deployed at a point of use including, but not limited to, a point of sale device and an access control device. These devices can be deployed at, for example, a check out stand or an access location.

In such embodiments, the credentials can be, but are not limited to, smart cards, magnetic stripe cards, cell phones and personal digital assistants. Further, in some cases, the transaction device is operable at two or more frequencies. In such cases, one of the credentials may be accessed at a first carrier frequency, while the other credential is accessed at a second carrier frequency. Thus, for example, it may be that the credential being read is accessed at one carrier frequency, while the other credential is accessed at another carrier frequency.

Yet other embodiments of the present invention provide transaction credential emulation devices. Such transaction credential emulation devices include a transaction control module that is deployed at transaction point. The transaction control module includes a transaction credential reader and a transaction credential writer. The transaction credential reader is operable to receive a transaction information from one transaction credential, and the transaction control writer is operable to provide the transaction information to a second transaction credential. In doing so, the written transaction credential becomes operable to access the transaction control module.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to transaction devices, and more particularly to systems and methods for emulating credentials for accessing transaction devices.

Various embodiments of the present invention provide systems for emulating access credentials, payment credentials, and/or other credentials. As an example, some of the systems include an transaction device that is capable of controlling access via an access point based on information provided via an access credential. Further, the transaction device is capable of writing another access credential such that the other access credential becomes operable to access the access point. In some cases, the transaction device is deployed local to the access point allowing a user to emulate a credential at a location generally visited by the user in utilizing a credential. As used herein, the term "access point" refers to any location or device where physical access is provided. Thus, such an access point can be a door, a window, or the like.

As another example, some of the systems include a transaction device that is deployed at a point of sale and capable of effectuating payment via a payment credential. Further, the transaction device is capable of writing another access credential such that the other access credential becomes operable to effectuate payment. Based on the disclosure provided herein, one of ordinary skill in the art will recognize a variety of other transaction devices, and deployment locations that can be used in accordance with embodiments of the present invention.

As used herein, the term "credential" refers to any portable device that includes information useful in completing a transaction. Thus, for example, a credential may be a smart card with information allowing a user of the credential to access an access point. As another example, a credential may be a payment device capable of transferring payment information to a transaction device. Such credentials may be, but are not limited to, credit cards, debit cards, access control cards, smart cards, cellular telephones, personal digital assistants, and/or the like. Such credentials may be capable of communicating via a magnetic stripe, a radio frequency interface, a wired interface, an optical interface, and/or the like. Thus, as just one example, a credential being read by a transaction device is wirelessly coupled to the transaction device, while another credential being written by the transaction device is coupled to the transaction device via a wired interface. As another example, an credential being read by a transaction device may be a wireless smart card, and a credential being written by the transaction device may be a cellular phone. Based on the disclosure provided herein, one of ordinary skill in the art will recognize a variety credentials and mechanisms for facilitating communications between credentials and transaction devices.

For the purposes of this document, the term "access credential" is a credential that is capable of, but not limited to, providing access via an access point. Also, for the purposes of this document, the term "payment credential" is a credential that is capable of, but not limited to, providing payment capability. For the purposes of this document, the term "transaction credential" is any credential used in relation to a transaction. Such a transaction can be a payment transaction, an access transaction, or any other type of transaction. Based on the disclosure provided herein.

Also, as used herein, the term "transaction device" refers to any device or equipment that can receive authorization information from a credential and perform functions in relation to completing a transaction. Thus, for example, a transaction device may be, but is not limited to, a payment device such as a point of sale device, or an access control module or device operable to control access via an access point. Based on the disclosure provided herein, one of ordinary skill in the art will recognize a variety of other transaction devices that can be used in relation to one or more embodiments of the present invention.

Transaction devices in accordance with one or more embodiments of the present invention are capable of operating at multiple carrier frequencies. In such instances, it may be that one credential is read at one frequency, and that an emulated credential is written at another carrier frequency. Use of such multiple frequencies may allow for communication with a broader array of credentials.

Various of the transaction devices can be used to emulate credentials. As used herein, the term "emulate" is used in its broadest sense to indicate a process whereby one credential is made capable of interacting with one or more transaction devices. Thus, for example, in emulating a credential transaction information from one credential is provided to another credential.

Figure 1A:
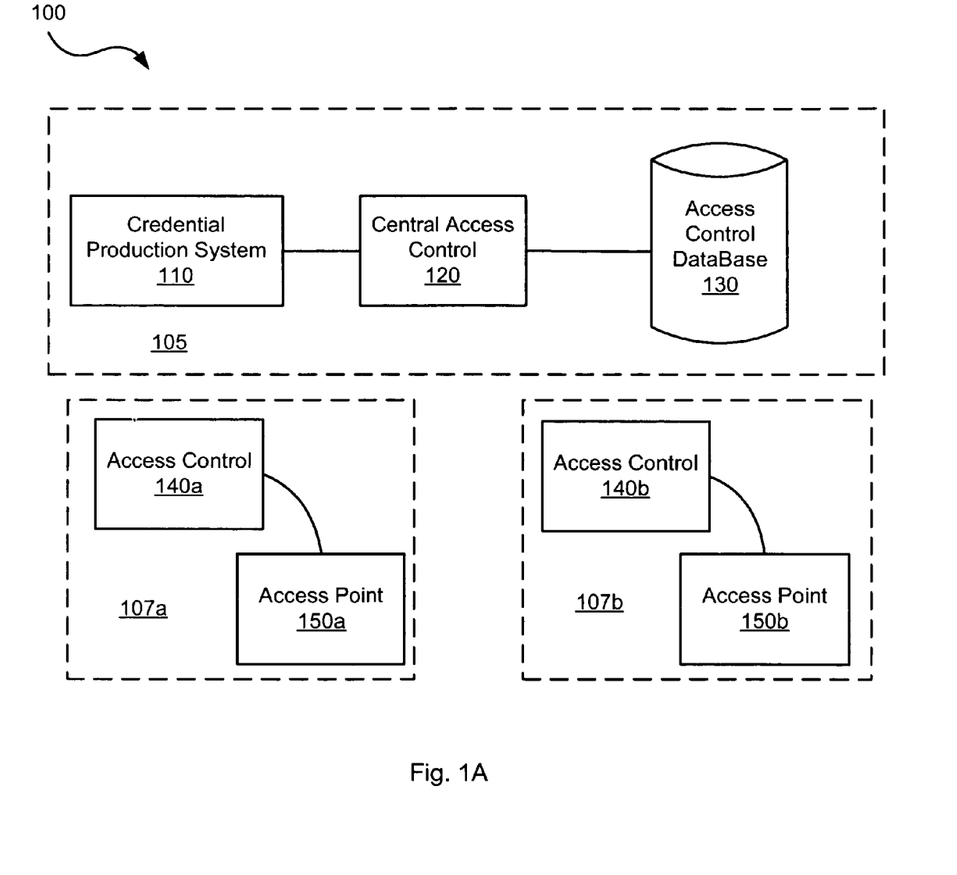
FIGS. 1A and 1B depict access control and payment control systems known in the art.

Turning to FIG. 1A, a known access control system 100 is illustrated. System 100 includes a remote processing system 105 and local operation systems 107. Each of operation systems 107 include access control devices 140 physically coupled to respective access points 150. Access control devices 140 are electrically wired to an actuator of the associated access point 150. When access point 150 is to be opened, access control device 140 sends an electrical signal to operate the associated actuator.

Access information that allows for access via one or both of access control devices 140 is programmed into credentials by a central access control 120 and a credential production system 110. This programming is done based on information from an access control database 130. In a typical scenario, remote processing system 105 is maintained by the security department of a company. The security department maintains access control database 130 as a list of all personnel authorized to enter company premises. A personnel may report to the security department and request an appropriate access credential. The access information associated with the person is gathered from access control database 130 and programmed into a blank access credential using access credential production system 110. This programmed access credential can then be used by the person to access one or more of access points 150 through presentation to respective access control devices 140.

Figure 1B:
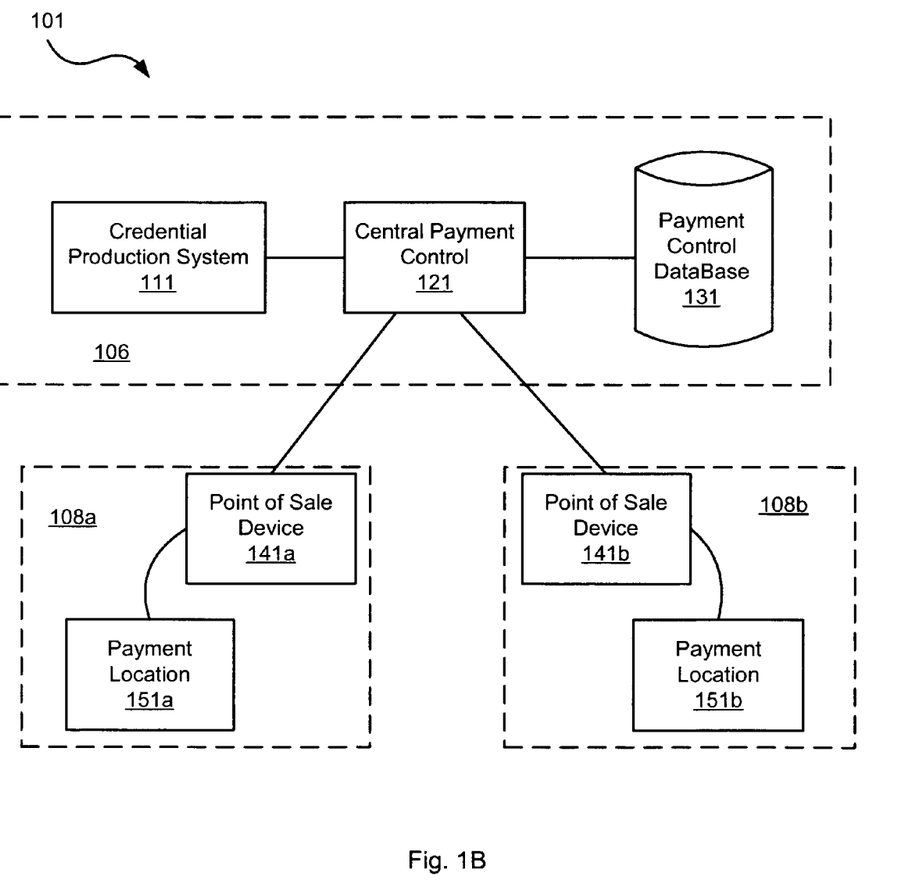

Turning to FIG. 1B, a known payment control system 101 is illustrated. System 101 includes a remote processing system 106 and local operation systems 108. Each of operation systems 108 include point of sale devices 141 deployed at a payment location 151, such as, a cash register at a department store. When a payment is to be made, a customer presents a credential at one of point of sale devices 141. In turn, payment information, such as, for example, a credit card number, is received by point of sale device 141 and transmitted to a central payment control 121. This information is validated by central payment control 121 through use of a payment control database 131. In turn, central payment control 121 passes either a payment authorization or declines payment. The transaction is then finished based on the authorization or denial.

Payment information that allows for payment using one or both of point of sale devices 141 is programmed into credentials by a central payment control 121 and a credential production system 111. This programming is done based on information from an payment control database 131. In a typical scenario, remote processing system 106 is maintained by, for example, a credit card company. The company maintains payment control database 131 as a list of all persons authorized to make payments, and limits on such payments. A person desiring to obtain a payment credential contacts the company and requests the credential. In turn, the company verifies the status of the person and authorizes payment limits. The company also produces a payment credential using credential production system 111, and the payment credential is sent to the person. The payment credential can then be presented by the person to point of sale device 141 to finalize a purchase.

Figure 2:
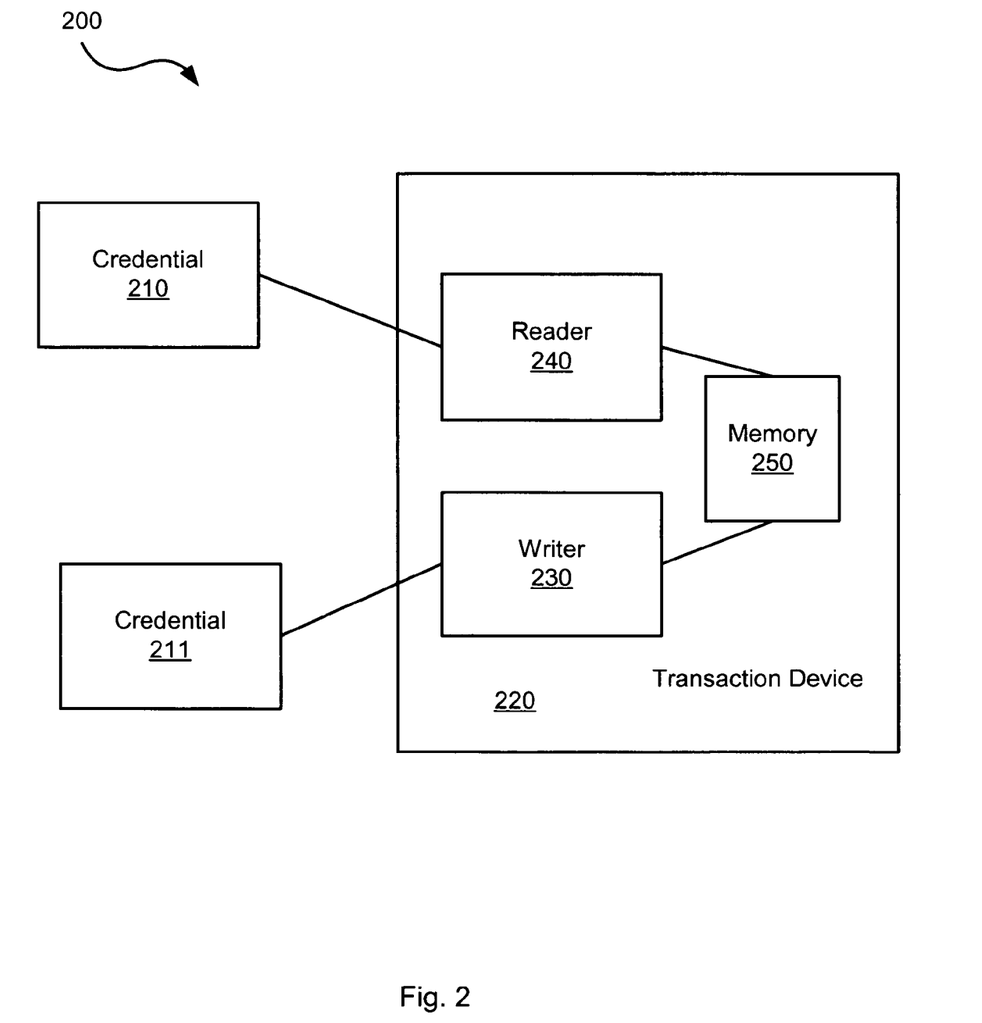
FIG. 2 illustrates an emulation capable transaction system and device in accordance with various embodiments of the present invention.

Turning to FIG. 2, an emulation capable transaction system 200 in accordance with various embodiments of the present invention is illustrated. System 200 includes a readable credential 210 and a readable/writable credential 211. As will be appreciated from the following disclosure, readable credential 210 may be in some cases writable as well. System 200 also includes an emulation capable transaction device 220. Emulation capable transaction device 220 includes a reader 240 and a writer 230. Each of reader 230 and writer 240 are communicably coupled to a memory 250. As used herein, the term "communicably coupled" is used in its broadest sense to mean coupling by any mechanism allowing communication of information. Thus, communicably coupled can be, but is not limited to, electrically coupled, optically coupled, audibly coupled, radio frequency coupled, and/or the like.

In operation, credential 210 is presented to transaction device 220. Transaction information is passed from credential 210 to transaction device 220 via reader 240. As will be appreciated by one of ordinary skill in the art, this information can be passed using one of a number of methods and can be passed in a variety of forms. In one particular embodiment of the present invention, credential 210 is a radio frequency identification credential capable of transmitting transaction information via a radio frequency to reader 240. As just some examples, various radio frequency readers are disclosed in U.S. patent application Ser. No. 11/076,090 entitled "Systems and Methods for Access Control", filed by Conlin et al. on a date even herewith. The entirety of the aforementioned application is incorporated herein by reference for all purposes.

In one particular embodiment of the present invention, the transaction information is transferred from credential 210 as a bit stream modulated by a carrier frequency. This bit stream includes a sync code and a command word followed by data. The sync code is used it synchronize to the incoming stream, the command word can indicate the operation being requested such as pay, enter, read, write, or any other command to actuate the transaction device. Based on the disclosure provided herein, one of ordinary skill in the art will recognize a number of sync codes, command words, and/or data packages that may be used in accordance with one or more embodiments of the present invention.

This transaction information is stored to memory 250. In addition, the transaction information may be used to authorize and effectuate a particular transaction. Thus, for example, where transaction device 220 is an access control device, the transaction information can be parsed, and a determination made whether the transaction information is associated with a person authorized to access the access point associated with the transaction device. Where the person is authorized, the access point is opened, otherwise access is denied. As another example, where transaction device is a credit card processing device, the transaction can be parsed, and the payment information gleaned from the credential by reader 240. This payment information can then be transmitted to a credit card processing facility, and in return the credit card processing facility provides either an authorization or denial. Based on the disclosure provided herein, one of ordinary skill in the art will appreciate that transaction device 220 may be one of a number of different transaction device types as are known in the art.

In addition to transaction processing capabilities as described above, transaction device 220 includes emulation capabilities. Such emulation capabilities are implemented using writer 230 to upload transaction information to credential 211. In one particular embodiment, the transaction device writes the credential by issuing a write command via writer 230 that is recognized by credential 211. The write command is followed by program data that is received by credential 211 and stored therein. This program data can then be used to actuate transaction device 220 the next time credential 211 is presented to transaction device 220. Based on the disclosure provided herein, one of ordinary skill in the art will appreciate a number of different ways to write data to credential 211 that would be in accordance with one or more embodiments of the present invention.

Writing the transaction information to credential 211 which is also capable of communicating the transaction information to transaction device 220 creates another credential 211 (i.e., emulates the first credential in the second credential) capable of carrying out transactions enabled thereby. As will be appreciated by one of ordinary skill in the art, providing such emulation capability allows a user with many credentials to combine such credentials into a single credential. As a more particular example, a user with a radio frequency identification access credential, a magnetic stripe payment credential, and a credential enabled cellular phone may be able to access a transaction device capable of reading the payment credential and upload the transaction information therefrom to the cellular phone; and access a transaction device capable of reading the access credential and upload the transaction information therefrom to the cellular phone. As such, the cellular phone is enabled to perform payments similar to that done using the payment credential, and access similar to that done using the access credential. This can be done without visiting a centralized control point (e.g., a credit card processing company or a security department).

Figure 3A:
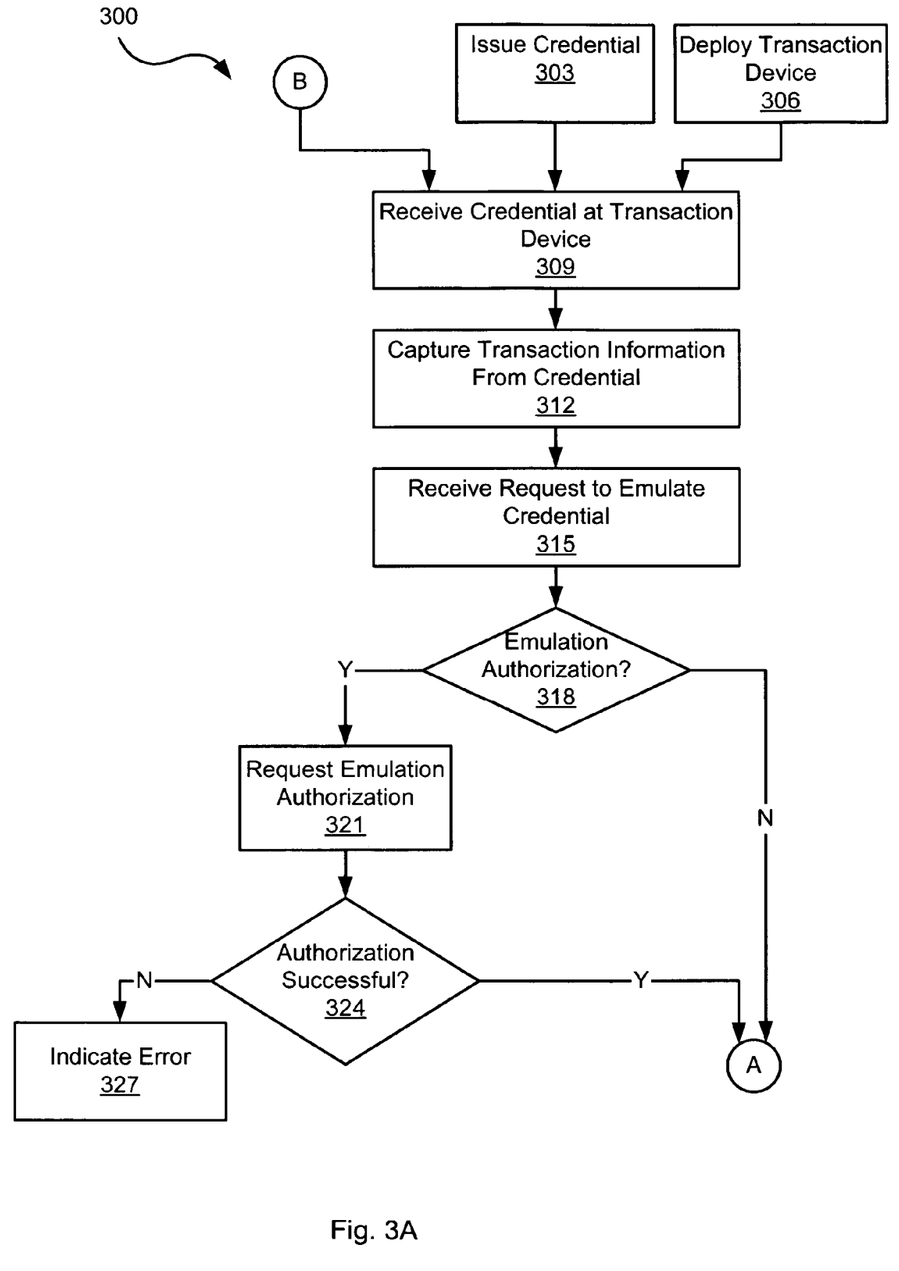
FIGS. 3A and 3B are flow diagrams illustrating methods for using transaction devices in accordance with one or more embodiments of the present invention.
Figure 3B:
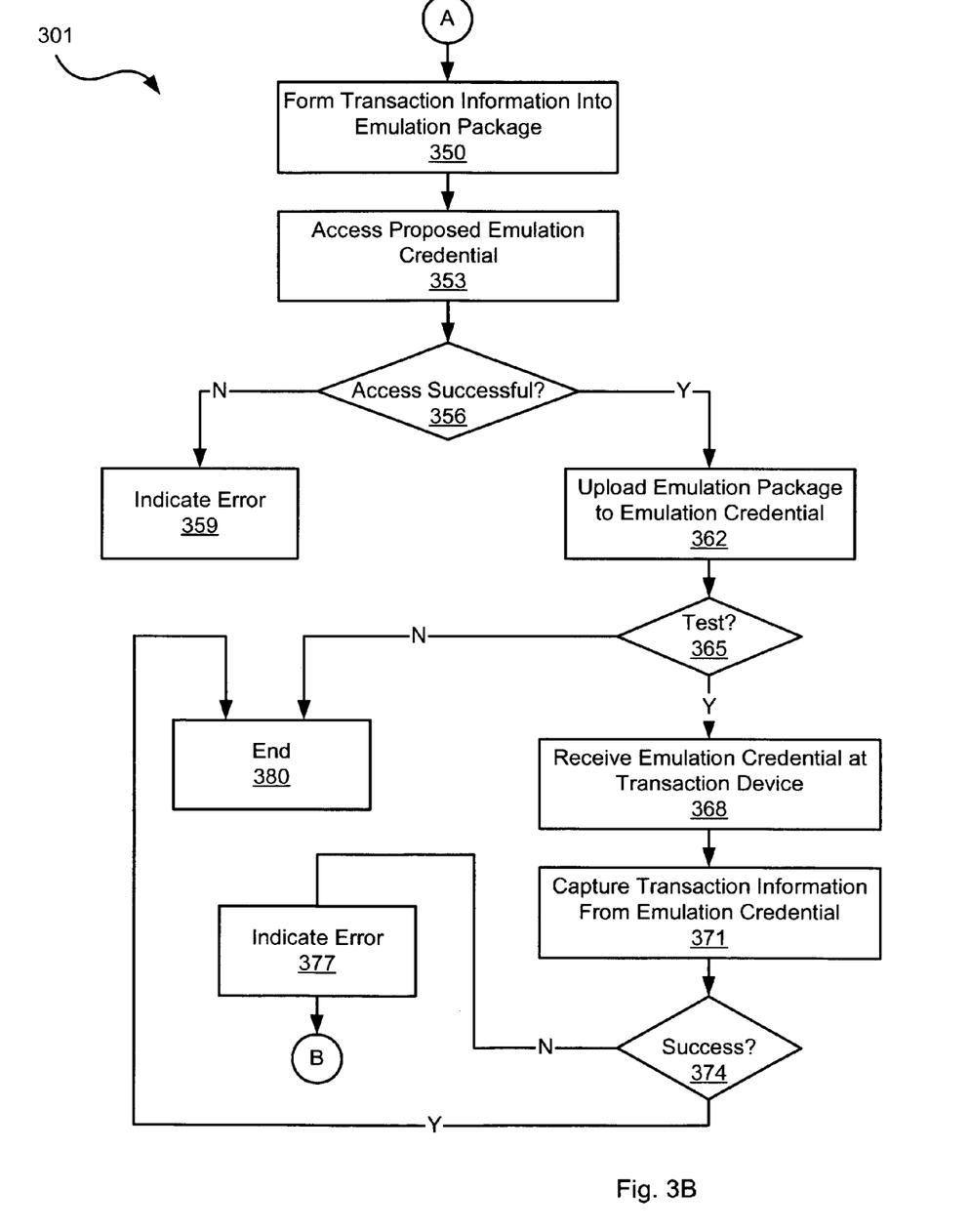

Turning to FIGS. 3A and 3B, flow diagrams 300, 301 illustrate methods for using transaction devices in accordance with one or more embodiments of the present invention. Following flow diagram 300, a credential is issued (block 303), and a transaction device is deployed (block 306). As one example, in an access control system, the credential may be created at a security office of a corporation interested in governing access to one or more of its buildings. In such a case, the transaction device may be deployed near a door or other access point that will be susceptible to the credential. In some cases, deploying the transaction device can include wiring or otherwise coupling the transaction device to a latch or other access control associated with the access point.

As another example, in a point of sale system, the credential may be a credit card or debit card issued by an issuing institution. In such cases, deploying the transaction device may include installing a point of sale device at a location where a purchase may be consummated. In some cases, this may include coupling the point of sale device to a cash register at a retail check out stand. Based on the disclosure provided herein, one of ordinary skill in the art will recognize a variety of other deployment and issuance approaches and/or processes that may be used in accordance with one or more embodiments of the present invention.

Continuing with flow diagram 300, the issued access credential is received at the deployed transaction device (block 309). This may include transmitting information from the credential to the transaction device via a wireless or wired interface. As previously suggested, a wireless interface may be, but is not limited to, an optical interface, a radio frequency interface, a cellular interface, and/or the like. The information transmitted from the credential (block 309) is captured by the transaction device and stored in a memory associated therewith (block 312). In some cases, this information may be sufficient to actuate the transaction device. Thus, for example, this information may be sufficient to trigger the transaction device to at least begin a payment process. As another example, this information may be sufficient to cause an actuator associated with an access point to release and allow entry through the access point. Based on the disclosure provided herein, one of ordinary skill in the art will appreciate a number of other uses for the access information.

In various embodiments of the present invention, a request to emulate the credential is also received at the transaction device (block 315). In some cases, this request may be received by pressing one or more buttons associated with the transaction device. In other cases, this request may be received wirelessly by presenting an emulation credential to the transaction device. In such a case, the presented emulation credential may upload information to the transaction device that indicates authority to emulate the previously presented credential. This indication of authority may include one or more private codes programmed by an owner of the issued credential into the emulation credential. Based on the disclosure provided herein, one of ordinary skill in the art will recognize a variety of methods whereby a desire to create an emulation credential can be communicated to the transaction device.

It is determined whether authorization must first be obtained before creating an emulation credential (block 318). Where authorization is required (block 318), authorization information is requested (block 321) and it is determined if the requested authorization information satisfies any required authorization criteria (block 324). As an example, it may be required that the registered owner of the issued credential be the same as the registered owner of the emulation credential. As another example, a user may be required to enter a personal identification code associated with the issued credential into the transaction device before being allowed to create an emulation credential. Based on the disclosure provided herein, one of ordinary skill in the art will recognize a variety of approaches that can be used for authorizing the creation of an emulation credential. Where the authorization is unsuccessful (block 324), and error code is indicated (block 327).

Alternatively, where the authorization is successful (block 327), or where no authorization is required (block 318), the process proceeds to flow diagram 301 as indicated by the letter "A". Following flow diagram 301, the previously received transaction information is retrieved from memory and formed into an emulation package (block 350). This emulation package includes all information necessary to prepare the emulation credential to act as a proxy for the issued credential. Thus, for example, the emulation package may contain an access code, an indication of one or more carrier frequencies at which associated access readers operate, and any other information related to access a given set of access controllers. A similar package is formed for other transaction devices such as, for example, point of sale devices. The emulation credential is accessed (block 353). This may include, for example, sending one or more messages to the emulation credential and receiving one or more responses therefrom. This process may include, but is not limited to, sending a setup message to the emulation credential that prepares the emulation credential to receive and accept the emulation package. It is then determined if the access to the emulation credential was successful (block 356). Where the access to the emulation credential is not successful (block 356), an error message is indicated (block 359).

Alternatively, where the access to the emulation credential is successful (block 356), the emulation package is uploaded to the emulation credential (block 362). In turn, the emulation credential receives the emulation package, stores the various information from the emulation package, and uses the information to prepare the emulation credential to act as the issued credential. It is determined whether the emulation credential is to be tested (block 365). Where testing of the emulation credential is not requested otherwise indicated (block 365), the process ends (block 380).

Alternatively, where the emulation credential is to be tested (block 365), the emulation credential is received at the transaction device as if a new transaction is being initiated (block 368). This is as if the emulation credential is being presented to the transaction device as the issued credential was in the previously described block 309. The transaction information is captured from the emulation credential (block 371), and it is determined if the emulation credential was properly prepared to act as the issued credential (block 3714). Where the emulation is successful (block 374), the process ends (block 380). Otherwise, an error message is indicated (block 377).

In another embodiment of the present invention, an emulation credential is created as follows. The emulation credential is presented to a transaction device capable of writing credentials. The transaction device reads the emulation credential and determines that it is writable, and that it does not include data or a program sufficient to actuate the transaction device. Either simultaneously or within a timeout period, a credential capable of actuating the transaction device is presented to the transaction device. This sequence causes the transaction device to recognize that the transaction information from the enabled credential is to be written to the emulation credential. As such, the transaction device is not actuated to perform the standard function assigned to the transaction device, but rather, the transaction device looks again (sends and receives information to/from) the emulation credential. In some cases, the transaction device is querying to determine if it is the same emulation credential that it previously recognized. Once found, the transaction device begins to upload the transaction information derived from the enabled credential to the emulation credential. This may be done, for example, by sending a write command/message followed by the appropriate transaction information received from the enabled credential. The emulation credential receives and stores the incoming information. At such time, the emulation credential is enabled to actuate the transaction device.

Figure 4:
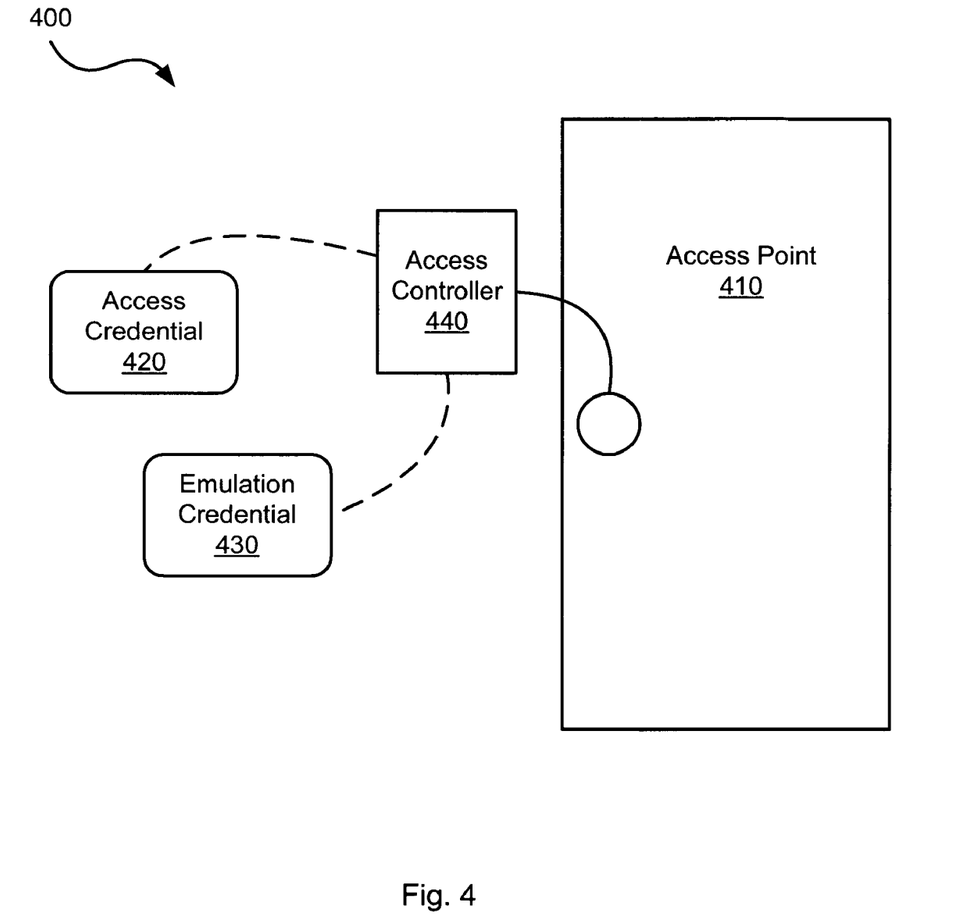
FIG. 4 depicts an emulation system with the transaction device capable of emulation being deployed local to an access point in accordance with various embodiments of the present invention.

Turning now to FIG. 4, a particular embodiment of the present invention showing an emulation system 400 embodied as an access control system in accordance ton one or more embodiments of the present invention is depicted. Emulation system 400 includes an access controller 440, an emulation credential 430, and an access credential 420. Access controller 440 is communicably coupled to a latch associated with an access point 410. In operation, access credential 420 is presented at access controller 440. This may be sufficient to actuate the latch associated with access point 410. In addition, a request to form an emulation credential may be received. Where such is the case, access controller 440 uploads information to emulation credential 430 such that emulation credential 430 becomes capable actuating access controller 440 similar to that of access credential 430.

From this point, access controller 440 may be actuated by either of access credential 420 or emulation credential 430. In one particular case, upon successful creation of emulation credential 430, access credential 420 is disabled by a message written to access controller 440 to access credential 420. In such cases, only one credential is ever left to actuate access controller 440. This may be advantageous where additional security is desired through limiting the proliferation of credentials capable of accessing transaction devices.

One of ordinary skill in the art will appreciate that while system 400 is specific to an access control application, similar principles and approaches can be applied to systems using other types of transaction devices. Such other transaction devices may be, but are not limited to, point of sale devices.

Based on the disclosure provided herein, one of ordinary skill in the art will appreciate a number of advantages associated with one or more embodiments of the present invention. For example, some embodiments of the present invention provide systems and/or methods whereby a number of credentials can be emulated by a single "universal" credential this eliminates the need for a user to carry a multiplicity of credentials. Further, one or more embodiments of the present invention provide systems and/or methods whereby a credential issuer may issue "temporary" credentials with the expectations that such credentials will be used to upload information to an emulation credential. Based on the disclosure provided herein, one of ordinary skill in the art will recognize a number of other advantages associated with one or more of the inventive systems and methods disclosed herein.

In conclusion, the present invention provides novel systems, devices, methods and arrangements for facilitating credential emulation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for emulating access credentials, the system comprising:
    an access control module, wherein the access control module is electrically coupled to an access point, and wherein the access control module includes:
    an access credential reader, wherein the access credential reader is operable to receive an access information from a first access credential that is capable of independently authorizing to the access credential reader;
    an access credential writer, wherein the access credential writer is operable to provide at least a portion of the access information to a second access credential; and
    wherein the second access credential is operable to receive the portion of the access information from the access credential writer, wherein the second access credential becomes operable to emulate the first access credential's ability to access the access point upon receiving the portion of the access information, and wherein the second access credential is selected from a group consisting of: a cell phone and a personal digital assistant.

2. The system of claim 1, wherein the first credential is a smart card.

3. The system of claim 1, wherein the first credential is communicably coupled to the access credential reader via an interface selected from the group consisting of: a magnetic stripe interface, a radio frequency interface, an optical interface, and a wired interface.

4. The system of claim 1, wherein the second credential is communicably coupled to the access credential writer via an interface selected from the group consisting of: a magnetic stripe interface, a radio frequency interface, an optical interface, and a wired interface.

5. The system of claim 1, wherein the first credential is a smart card and the second credential is a cell phone, wherein the smart card is communicably coupled to the access credential reader via a wireless interface, and wherein the cell phone is communicably coupled to the access control module via a radio frequency interface.

6. The system of claim 1, wherein the information from the first access credential is received at a first carrier frequency, and wherein the access information is provided to the second access credential at a second carrier frequency.

7. The system of claim 1, wherein the information from the first access credential is a bit stream, and wherein the access information provided to the second access credential is the bit stream.

8. A method for credential emulation, the method comprising:
    providing a transaction device, wherein the transaction device is installed at a point of use;
    receiving an information set by the transaction device from a first credential that is capable of independently authorizing to the transaction device;
    writing at least a portion of the information set from the transaction device to a second credential, wherein the second credential becomes operable to emulate an ability of the first credential upon receiving the portion of the access information; and
    wherein receiving the information set by the transaction device from the first credential is done at a first carrier frequency, and wherein writing at least a portion of the information set from the transaction device to the second credential is done at a second carrier frequency.

9. The method of claim 8, wherein the transaction device is: a point of sale device.

10. The method of claim 8, wherein the point of use is selected from a group consisting of: a check out stand and an access location.

11. The method of claim 8, wherein the first credential is selected from a group consisting of: a smart card, a magnetic stripe card, a cell phone and a personal digital assistant.

12. The method of claim 11, wherein the second credential is selected from a group consisting of: a smart card, a magnetic stripe card, a cell phone and a personal digital assistant.

13. The method of claim 8, wherein the first credential is communicably coupled to the access control device via an interface selected from the group consisting of: a magnetic stripe interface, a radio frequency interface, an optical interface, and a wired interface.

14. A transaction credential emulation device, wherein the device comprises:
    a transaction control module, wherein the transaction control module is installed at a transaction point, and wherein the transaction control module includes:
    a transaction credential reader, wherein the transaction credential reader is operable to receive a transaction information from a first transaction credential that is capable of independently authorizing to the transaction control module;
    a transaction credential writer, wherein the transaction credential writer is operable to provide the transaction information to a second transaction credential; and
    wherein the second transaction credential is operable to receive the transaction information from the transaction credential writer, wherein the second transaction credential becomes operable to emulate the first transaction credential's ability to access the transaction control module, and wherein the second transaction credential is selected from a group consisting of: a cell phone and a personal digital assistant.

15. The device of claim 14, wherein the first transaction credential is selected from a group consisting of: a magnetic stripe card, and a radio frequency card.

16. The system of claim 1, wherein the access control module is wired to an access control associated with the access point.

17. The system of claim 16, wherein the access control is a latch.

* * * * *